Nov. 29, 1927. 1,650,674

G. E. WEAVER

TIRE CHANGER

Filed March 28, 1924 3 Sheets-Sheet 1

Witness:
A. J. Sauser

Inventor
Gailard E. Weaver
By Walter M. Fuller
Atty.

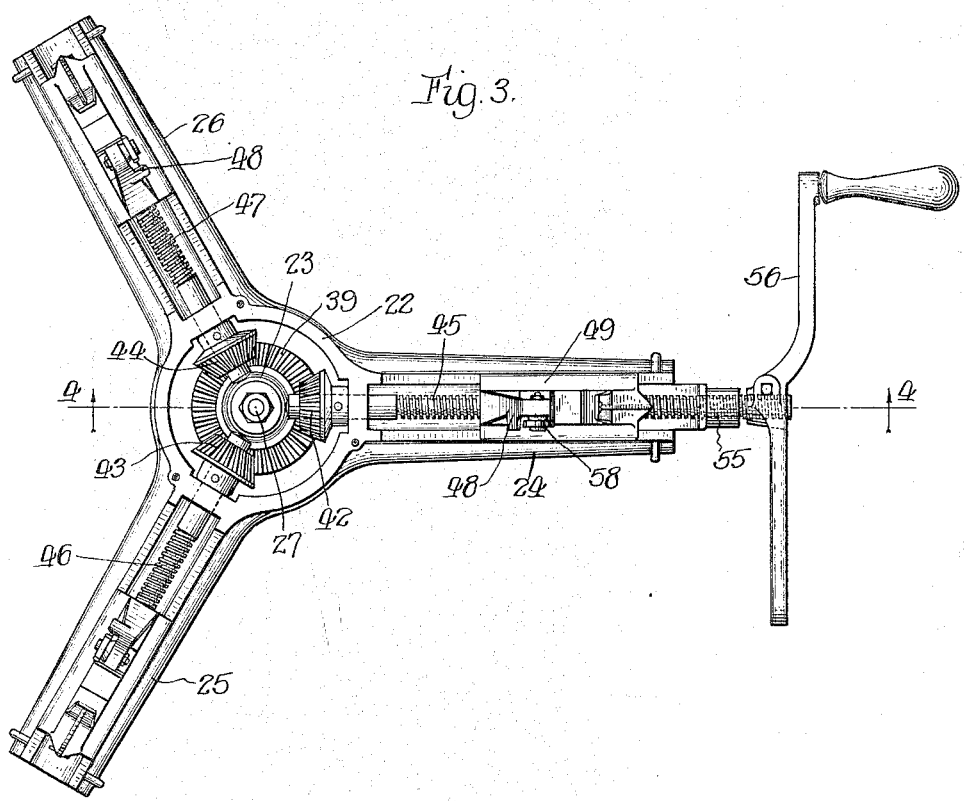
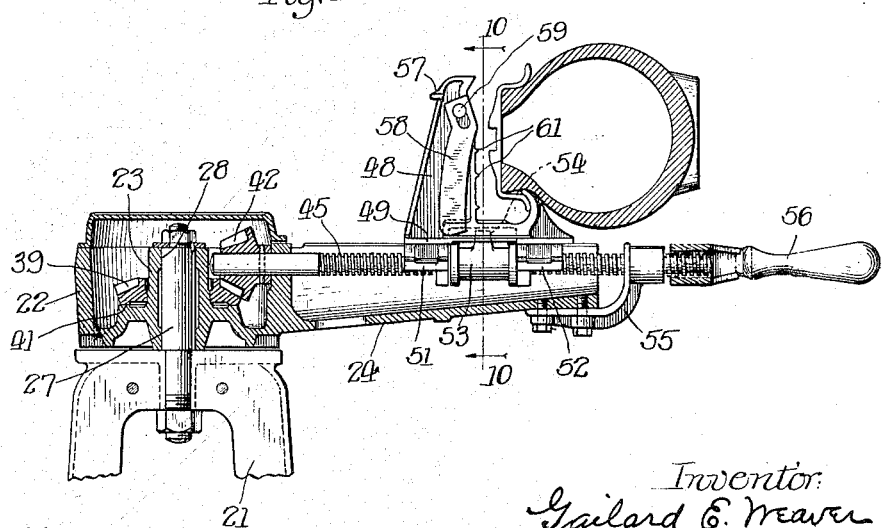

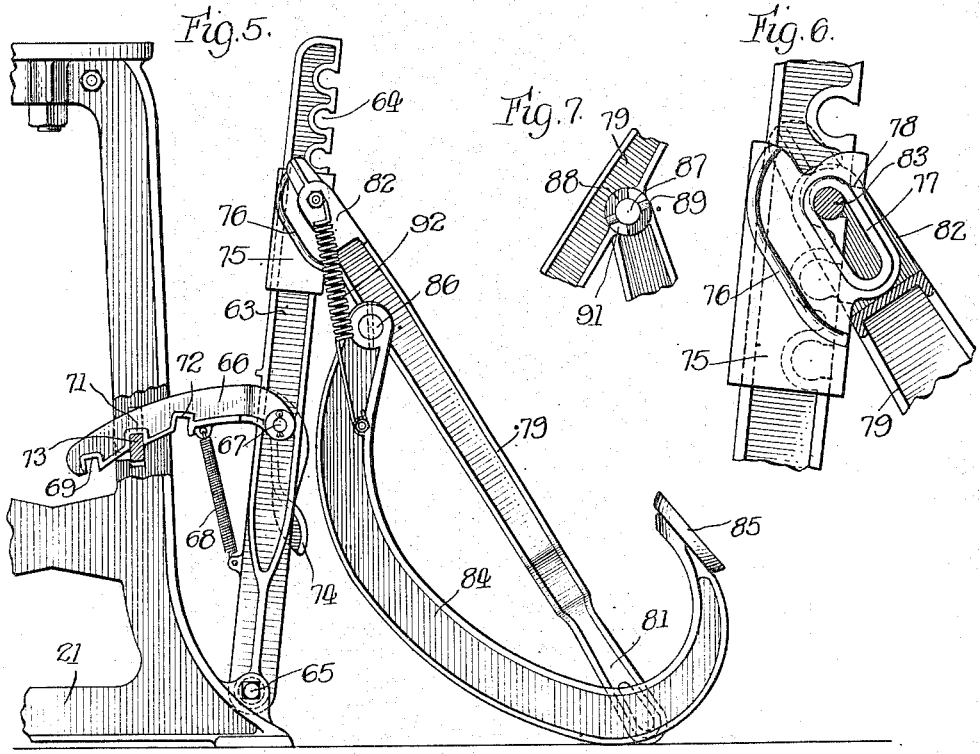
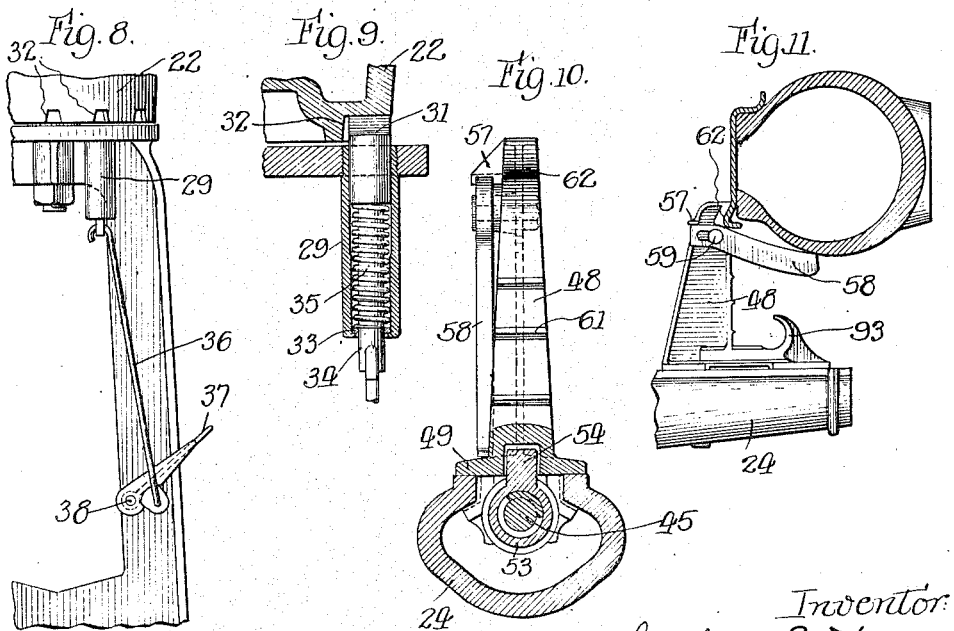

Patented Nov. 29, 1927.

1,650,674

UNITED STATES PATENT OFFICE.

GAILARD E. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TIRE CHANGER.

Application filed March 28, 1924. Serial No. 702,548.

My invention relates to tire changers, or machines for facilitating the removal of tires from and their application to vehicle-wheel rims and wheels.

One object of the invention is to provide an appliance of this type which will accommodate all kinds of disc and wire wheels, and rims of both the solid and transversely-split form.

Another purpose of the invention is to supply a universal tire-changer which is simple in structure and operation, which comprises but few parts plain in design and which are unlikely to be broken or injured in service, and which performs its work expeditiously, safely and conveniently.

In the accompanying drawings forming a part of this specification, and throughout the several views of which like reference characters have been employed to designate the same parts, a desirable and preferred form of the invention has been illustrated.

In these drawings,—

Fig. 3 is a top plan view of the mechanism, the lower parts of the machine being omitted for the sake of clearness;

Fig. 4 is a fragmentary vertical section on line 4—4 of Fig. 3, the parts being viewed in the direction indicated by the arrows;

Fig. 5 is an enlarged, fragmentary, detail view of the lower portion of the machine;

Fig. 6 illustrates in section the connection between the operating handle and the ratchet bar;

Fig. 7 shows in fragmentary section the connection between the goose-neck or hook with the operating lever;

Fig. 8 shows fragmentarily, in elevation, the means for locking the head of the machine in fixed position;

Fig. 9 is an enlarged, vertical section showing the lock more fully, on an enlarged scale;

Fig. 10 is an enlarged, vertical, cross section on line 10—10 of Fig. 4; and

Fig. 11 is a fragmentary, detail view illustrating the manner of supporting the tire and rim on the supplemental arms secured to the radially-movable jaws designed to engage the rim.

Figure 1:
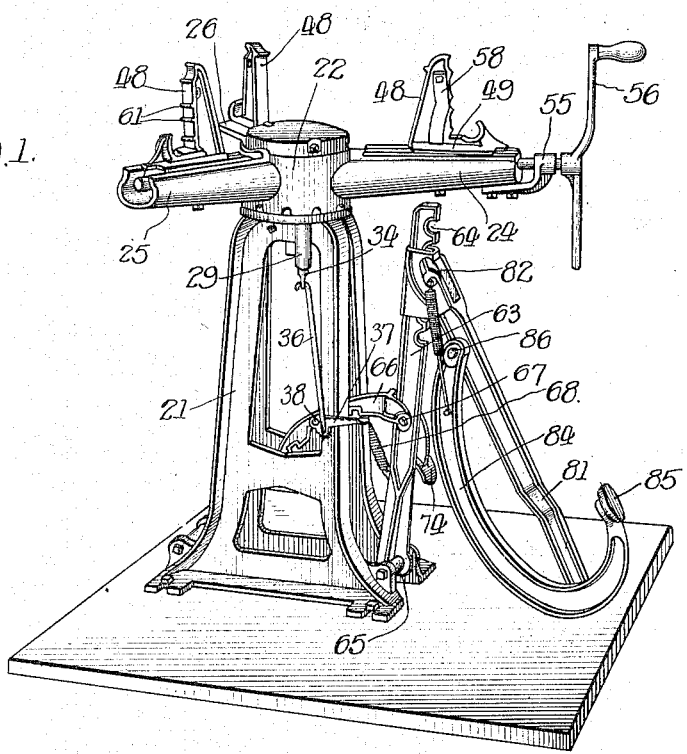
Fig. 1 is a perspective view of the new machine.

Referring to these drawings, it will be perceived that the device includes an upright stand or standard 21 of suitable and appropriate design, its base being bolted or otherwise fastened to the floor or to a convenient platform.

A casting 22 having a central hub portion 23 and three hollow, slotted arms 24, 25 and 26 radiating therefrom, is revolubly mounted on the stand or standard, on a central, upstanding, stationary shaft 27 extended through a hole in the top of the stand and a bearing 28 through the hub part of the rotatable member, whereby the latter may be turned in a horizontal plane.

To prevent this revoluble member from rotating except when such movement is desired, the top part of the standard is supplied with a depending, hollow pocket or socket element 29 (Figs. 8 and 9) threaded into and extended through the top table portion of the standard, thus supplying a socket or casing for a sliding, locking dog or pin 31 designed to project upwardly beyond the top face of the standard to enter any one of a number of cavities or recesses 32 arranged in an annular series in the under face of the member 22.

The lower border of the casing or shell 29 is inturned to support a centrally-apertured washer 33, through which the reduced-diameter shank 34 of the dog 31 extends downwardly and against which the lower end of a coiled spring 35 encircling such shank bears, the upper end of the spring pressing against the locking dog to normally keep it properly projected into operative position, as will be readily understood.

To facilitate this locking action, the recesses 32 and the end of the dog 31 may conveniently be made somewhat tapered.

A link 36 connects the lower end of the shank 34 with a pedal 37 fulcrumed on the standard at 38, whereby pressure by the foot on the pedal retracts the locking dog or pin and permits the top part or armed head of the structure to be revolved horizontally.

A bevel gear 39 (Figs. 3 and 4), revoluble on the hub 23 and supported on its circular ledge 41, meshes with three bevel pinions 42, 43 and 44, each fixed on the inner end of one of three radiating screw-shafts 45, 46 and 47, one in each of the three arms 24, 25 and 26, each shaft at its inner end having a bearing in the part 22, as shown in Fig. 4.

Each of the diverging or radiating arms is supplied with an upstanding jaw 48, the base of which is slidable longitudinally on the upper, smooth face of the arm, such base having spaced, depending lugs or bosses 51 and 52, one or both of which affords a bearing for the screw-shaft, which between and bearing on the adjacent faces of the lugs has a nut 53 with a top extension 54 in a recess in the under face of the base of the jaw to prevent turning of the nut, whereby to effect the longitudinal propulsion of the jaw inwardly or outwardly, as the case may be, when the screw-shaft is rotated in the one direction or the other.

The screw-shaft 45 is somewhat longer than the other two, and its projecting outer end is supported in a bearing on a bracket 55 (Fig. 4), the extreme outer end of the shaft being fitted with a suitable turning handle 56, revolution of which through the shafts, gears and nuts produces a simultaneous radial expansion or contraction of the several jaws on their arms.

On one side near its top, each jaw has an outstanding, lateral lug 57, and adjacent to this there is a bent supporting arm 58 mounted on the same side of the jaw by a pin and slot connection 59.

Thus these arms may be projected beyond the jaws in operative rim or tire supporting position, with their inner ends beneath and bearing upwardly against the lugs 57 to hold them in place (see Fig. 11), or they may be shifted lengthwise by reason of their slots and dropped to substantially-vertical, inoperative position (see Fig. 4).

The outer face of each jaw 48 desirably has a number of vertically-spaced, horizontal ribs 61, and each jaw near its upper end has a recess 62 designed to accommodate the inner, circular bead or rib present on some styles of rims, as shown in Fig. 11.

A ratchet bar 63, having a series of undercut notches 64 along the upper portion of its outer edge, is fulcrumed on the base of the machine at 65, whereby it is permitted to rock radially inwardly or outwardly with respect to the vertical, center axis of the mechanism.

In order that this ratchet bar may be locked in any one of several desired positions, it is supplied with a notched lock-arm 66 fulcrumed thereon at 67 and normally pulled downwardly by a coiled, contractile spring 68 fastened at its lower end to the ratchet bar 63 and at its upper end to the members 66.

In the present instance this lock arm 66 has three spaced notches 69, 71 and 72 in its lower edge, any one of which is designed to accommodate in part a bar 73 substantially horizontally arranged between two legs or spaced portions of the standard 21.

Figure 2:
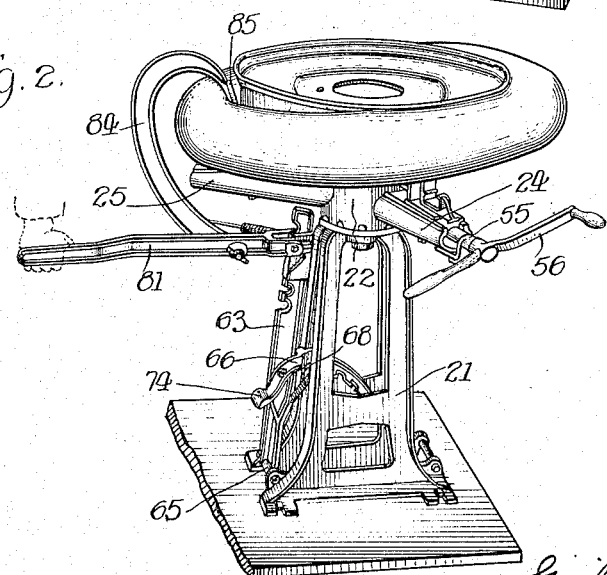
Fig. 2 is a somewhat similar view, illustrating the manner of removing a tire from a rim on the appliance.

As is shown in Figs. 1, 2 and 5, that portion of the element 66 pivoted to the ratchet bar is bifurcated so as to straddle such bar, and one section of the bifurcation is extended downwardly to form a pedal or foot lever 74 by which the lock bar may be easily raised through the action of the operator's foot on the pedal.

As shown, the ratchet bar 63 may be locked in three different positions by reason of the three notches in the bottom margin of the lock arm or lever 66.

Such ratchet bar is supplied with a hollow slide 75 fitted over and movable lengthwise on the bar 63, such part 75 on its two side faces having curved ribs 76, shown in detail in Figs. 5 and 6.

The two side walls of the slide 75 have downwardly-inclined, alined slots 77, and the front wall of the part 75 has an aperture 78.

The operating lever 79 has a handle 81 at its outer end, and its inner end is bifurcated at 82 to straddle the block 75 and overlie its two side faces.

The two spaced extensions 82 forming the bifurcated inner end of the handle-lever are sufficiently long to overlap and bear on the ribs 76 to limit or restrict the lateral movement of the handle. These two arms or extensions 82 are connected together by a fulcrum pin 83 designed to be accommodated in any one of the sockets or cavities 64 and extended through the two registering, inclined slots 77.

Owing to the weight of the part 75 and the inclination of its slots, the margins of the latter act to hold the pin 83 from unintentional dislodgement out of the socket or recess 64 in which it then happens to be accommodated.

This pin 83 constitutes the pivot or fulcrum pin for the handle-lever 79, and in case it is desired to adjust the position of such pin into another one of the sockets 64, the operator raises the lever 79 to substantially horizontal position and pulls forwardly, such operation lifting the part 75 by reason of the wedging action of the pin 83 on the inclined border surfaces of the slots 77 so that the pin can be drawn out of the particular cavity 64 and moved into register with the desired cavity and pushed therein, whereupon it will be again locked by the block 75.

A long, hook-shaped member or gooseneck 84 carrying an anti-friction roller 85 at its free end is fulcrumed on the handle lever 79 at 86, being secured to a fulcrum pin 87 oscillatory in a suitable bearing 88 in the handle and limited in its rocking movements by a pin 89 projecting into arcuate slots 91 through the wall of the bearing.

This limited rocking or oscillatory movement of the goose-neck or hook member prevents it from falling unduly over onto the machine when no rim or tire is on it and it assists in lifting the hook upon raising the handle 79.

A coiled, contractile spring 92 connects the handle 79 with the element 84, thus tending to draw the hook member toward the rim when the handle is being pressed down, as shown, for example, in Fig. 2.

Assuming that a tire is to be removed from a solid as distinguished from a transversely-split, vehicle-wheel rim, the temporary supports 58 of the three jaws are projected into the operative position shown in Fig. 11, with the tail or end portion of each element 58 beneath and co-acting with the corresponding lugs 57.

Assuming that the jaws 48 have been contracted sufficiently by actuation of the handle 56, the rim and tire are placed on the machine resting on the arms 58.

Thereupon the handle 56 is turned in such direction as to simultaneously expand the jaws 48 until they firmly clamp the rim, their recesses 62 accommodating the bead or rib on the inner side of the rim, if any, as shown in Fig. 11.

Then the temporary supporting arms 58 are rocked down into inoperative position, whereupon these parts are now in the proper relation for the downward removal of the tire from the rim.

The operator steps on the pedal 74, thus unlocking the ratchet bar 63, and rocks the same outwardly away from the standard, in which position of the arm the goose-neck or hook member 84 may be readily swung up over the tire.

The fulcrum pin 83 having been introduced into the proper socket 64 and with the roller 85 of the goose-neck engaging the tire close up to the rim, the workman presses down on the lever-handle 79, carrying that portion of the tire downwardly, as will be readily understood.

By stepping on the pedal 37 the workman unlocks the head or top of the machine carrying the tire and rim, and by gradually revolving these parts and pressing downwardly on the handle 79 from time to time, the tire is readily removed from the rim.

During this operation, however, in order to give the roller on the goose-neck a tendency to hug the rim, which is desirable during the tire-removing operation, the ratchet arm 63 occupies an inner position, in which it is locked, as shown in Fig. 2.

Upon contracting the jaws, the rim may be readily taken off, and then the tire removed from the machine.

In somewhat similar manner, tire casings can be easily remounted on solid or un-split rims and on wire or disc wheels, but, of course, in such instances the tire is forced down onto the rim rather than away from it.

In mounting such tires on rims, if the construction permits, the rim may rest upon the bases of the jaws 48 and be held firmly in position by the jaws themselves.

It is to be observed that the roller of the goose-neck is held in contact with the rim by the light-pressure spring 92, and the inward position of the ratchet-bar during the operation of the goose-neck gives the roller an inward drag on the rim and keeps it in contact with the latter.

It is to be observed that the goose-neck or hook member can be adjusted up or down on the vertical ratchet-bar according to the size of tire to be handled, and this enables the operator to exert a maximum leverage through the handle.

In mounting tires on rims the vertical ratchet-bar is adjusted outwardly, so that the goose-neck will have a tendency to pull the tire outwardly, as well as downwardly, over the rim.

In order that the appliance may act efficiently on rims of the transversely-split type, each jaw-base is equipped with a small, outer, inwardly-facing hook 93 designed to engage the lower flange of the rim and contract the latter during inward radial travel of the jaws to permit the removal of the tire-casing.

Such a rim may be also expanded after the mounting of the tire thereon by direct engagement with the main portions 48 of the jaws, these being expanded in the usual way by turning of the handle 56.

This invention is not limited and restricted to the precise and exact details of structure presented because these may be modified within comparatively wide limits and still fall within the scope of the invention as defined by the appended claims. Stated somewhat otherwise, the invention is susceptible of a variety of satisfactory embodiments differing more or less in mechanical structure.

I claim:

1. In a tire-changer, the combination of a plurality of expansible-and-contractible rim-engaging jaws, means to operate said jaws, and supporting means for the rim or its tire mounted to be temporarily projected outwardly beyond the jaws into operative supporting position or to be retracted into inoperative non-projecting position after the jaws have clamped the rim.

2. In a tire-changer, the combination of a plurality of expansible-and-contractible rim-engaging jaws, means to operate said jaws, and a support on each jaw for the rim or its tire mounted to permit it to be projected individually outwardly beyond the jaw into temporary operative supporting position or to be retracted into inoperative position after the jaws have clamped the rim.

3. In a tire-changer, the combination of a plurality of expansible-and-contractible rim-clamping jaws with recesses in the upper portions of their outer faces to receive a bead on the inside of a rim and to hold the rim in elevated position and against descent, means to expand and contract said jaws, means to engage the upper face of a tire associated with the rim held by such jaws in the elevated position specified, and means to force said tire-engaging means downwardly progressively around the rim.

4. In a tire-changer, the combination of a plurality of expansible-and-contractible rim-clamping jaws with recesses in the upper portions of their outer faces to receive a bead on the inside of a rim and to hold the rim in elevated position and against descent, means to expand and contract said jaws, supporting means mounted to be temporarily projected outwardly beyond the jaws in a position to support the rim or its tire with the bead of the former in substantial register with the recesses of the jaws or to be retracted into inoperative non-projecting position after the jaws have clamped the rim, means to engage the upper face of a tire associated with the rim clamped by such jaws in the elevated position specified, and means to force said tire-engaging means downwardly progressively around the rim.

5. In a tire-changer, the combination of a plurality of expansible-and-contractible rim-clamping jaws with recesses in the upper portions of their outer faces to receive a bead on the inside of a rim and to hold the rim in elevated position and against descent, means to expand and contract said jaws, a support on each jaw mounted to permit it to be projected individually outwardly beyond the jaw temporarily to support the rim or its tire with the bead of the former in substantial register with the recesses of the jaws or to be retracted into inoperative position after the jaws have clamped the rim, means to engage the upper face of a tire associated with the rim clamped by such jaws in the elevated position specified, and means to force said tire-engaging means downwardly progressively around the rim.

6. In a tire-changer, the combination of a plurality of expansible-and-contractible rim-clamping jaws each having in the upper portion of its outer face a recess adapted to receive a bead on the inner face of a rim and to hold the rim in elevated position and against descent, means to operate said jaws, a hook-shaped member constructed to extend up over a tire associated with the rim clamped by such jaws in the elevated position specified and to engage its upper face, means to force said hook-shaped member downwardly to aid in mounting the tire on or demounting it from the rim, and means permitting relative rotation of said jaws and hook-shaped member whereby the latter may be caused to act progressively on the tire.

7. In a tire-changer, the combination of a plurality of expansible-and-contractible rim-clamping jaws each having in the upper portion of its outer face a recess adapted to receive a bead on the inner face of a rim and to hold the rim in elevated position and against descent, means to operate said jaws, a support on each jaw mounted to permit it to be projected temporarily individually outwardly beyond the jaw to support the rim or its tire with the bead of the rim in substantial register with the recesses of the jaws or to be retracted into inoperative position after the jaws have clamped the rim, a hook-shaped member constructed to extend up over the tire associated with the rim clamped by such jaws in the elevated position specified and to engage its upper face, means to force said hook-shaped member downwardly to aid in mounting the tire on or demounting it from the rim, and means permitting relative rotation of said jaws and hook-shaped member whereby the latter may be caused to act progressively on the tire.

8. In a tire-changer, the combination of means to support a rim, a rock-arm, means to lock said rock-arm in different positions of adjustment, a handle fulcrumed on said rock-arm, and a hook-shaped member operatively connected to said handle and adapted to extend up over the tire and to engage its upper face, whereby depression of the handle carries the hook-shaped member in the same direction to aid in mounting or demounting the tire, said support and hook-shaped member being relatively revoluble to permit said member to act on different portions of the tire.

9. In a tire-changer, the combination of a plurality of expansible-and-contractible rim-engaging jaws each having an outstanding lug, means to operate said jaws, and a bar on each jaw having a pin-and-slot connection therewith, whereby the bar may be maintained projected beyond the jaw while engaging the corresponding jaw-lug to act as a temporary support for the rim or its tire or may be retracted into inoperative position free from the lug after the jaws have clamped the rim.

10. In a tire-changer, the combination of radially-movable expansible-and-contractible rim-clamping jaws, means to operate said jaws simultaneously, a mounting for said jaws permitting them and the rim to be rotated in a substantially horizontal plane, a fulcrumed operating-handle, and a hook-shaped member operatively connected to said handle and constructed to extend up over a tire associated with the rim and to engage its upper face and designed to be depressed by said handle to aid in mounting the tire on or removing it from the rim.

11. In a tire-changer, the combination of means to support a rim, a rock-arm, means to lock said rock-arm in different positions of adjustment, a handle fulcrumed on said rock-arm, and a hook-shaped member operatively connected to said handle and adapted to extend up over the tire and to engage its upper face, whereby depression of the handle carries the hook-shaped member in the same direction to aid in mounting or demounting the tire.

12. In a tire-changer, the combination of means to support a rim, a rock-arm, means to lock said rock-arm in different positions of adjustment, a handle fulcrumed on said rock-arm, and a hook-shaped member fulcrumed on said handle and adapted to extend up over the tire and to engage its upper face, whereby depression of the handle carries the hook-shaped member in the same direction to aid in mounting or demounting the tire, said supporting means and hook-shaped member being relatively revoluble to permit said member to act on different portions of the tire.

13. In a tire-changer, the combination of means to support a rim, a rock-arm oscillatory in a substantially vertical plane, a handle fulcrumed on said rock-arm and oscillatory in a substantially vertical plane, and a hook-shaped member fulcrumed on said handle and adapted to extend up over the tire and to engage its upper face, whereby depression of the handle carries the hook-shaped member in the same direction to aid in the mounting or demounting of the tire, said supporting means and hook-shaped member being relatively revoluble to permit said member to act on different portions of the tire.

14. In a tire-changer, the combination of means to support a rim, a rock-arm oscillatory in a substantially vertical plane, means to lock said rock-arm in different positions of adjustment, a handle adjustably fulcrumed on said rock-arm, and a hook-shaped member fulcrumed on said handle and adapted to extend up over the tire and to engage its upper face, whereby depression of the handle carries the hook-shaped member in the same direction to aid in the mounting or demounting of the tire, said support and hook-shaped member being relatively revoluble to permit said member to act on different portions of the tire.

15. In a tire-changer, the combination of means to support a rim in a substantially horizontal plane with capacity for rotation in such plane, a rock-arm oscillatory in a substantially vertical plane, a handle fulcrumed on said rock-arm and oscillatory in a substantially vertical plane, and a hook-shaped member fulcrumed on said handle and adapted to extend up over the tire and to engage its upper face, whereby depression of the handle carries the hook-shaped member in the same direction to aid in the mounting or demounting of the tire, said supporting means and hook-shaped member being relatively revoluble to permit said member to act on different portions of the tire.

16. In a tire-changer, the combination of a stand, a member substantially-horizontally revoluble on said stand, means to lock said member against rotation on said stand, means permitting release of said lock, a plurality of rim-clamping jaws radially movable on said member, means to contract or expand said jaws substantially simultaneously, rests on said jaws constructed to permit their outward projection to allow a rim to be supported thereon preliminary to expansion of the jaws to grasp the rim and to permit their change to inoperative position after such grasp has been established, a ratchet-bar mounted to rock in a vertical plane, means to lock said ratchet-bar in different positions of adjustment, a lever-handle adjustably fulcrumed on said bar for substantially-vertical rocking movement, and a hook-shaped member fulcrumed on said handle and adapted to extend up over the top of the tire on the stand and to engage the upper face of the tire to facilitate its removal from or mounting on the rim.

17. In a tire-changer, the combination of a stand, a member substantially-horizontally revoluble on said stand and equipped with a plurality of radiating arms, means to lock said member against rotation on the stand, means permitting release of said lock, a plurality of jaws radially movable on said arms and each having a recess in the upper portion of its outer face adapted to receive a bead on the inside of a rim, means to contract and expand said jaws simultaneously, each of said jaws having an outstanding lug, a bar on each of said jaws having a pin-and-slot connection therewith, whereby the bar may be projected beyond the jaw while engaging the corresponding jaw-lug to act as a temporary support for the rim or its tire or may be retracted into inoperative position after the jaws have clamped the rim, a rock-arm oscillatory in a substantially vertical plane, means to lock said rock-arm in different positions of adjustment, a handle adjustably fulcrumed on said rock-arm, a hook-shaped member fulcrumed on said handle and adapted to extend up over the tire and to engage its upper face, whereby depression of the handle carries the hook-shaped member in the same direction to aid in mounting or demounting the tire, and a spring connecting said hook-shaped member and handle.

18. In a tire-changer, the combination of an arm having a plurality of spaced recesses in one edge, a block slidable on said arm and having a slot oblique to the axis of said arm, and an operating handle equipped with a fulcrum-pin normally occupying one of said recesses and the slot of said block, the obliquity of the wall of the latter normally preventing unintentional withdrawal of the fulcrum-pin from the arm-recess, whereby by manipulation of the handle the fulcrum-pin may be shifted from one recess to another.

In witness whereof I have hereunto set my hand.

GAILARD E. WEAVER.